United States Patent [19]

Koether et al.

[11] 4,036,995

[45] July 19, 1977

[54] OVEN COOKING MONITOR FOR UNIFORMLY COOKING A PLURALITY OF FOOD ITEMS REQUIRING DIFFERENT COOKING TIMES

[75] Inventors: Bernard G. Koether; Allan E. Witt, both of Westport, Conn.

[73] Assignee: Food Automation Service Techniques, Inc., Stratford, Conn.

[21] Appl. No.: 644,875

[22] Filed: Dec. 29, 1975

[51] Int. Cl.² .................... A23L 1/00; A47J 37/00
[52] U.S. Cl. ........................... 426/233; 426/523; 340/228 R; 99/342
[58] Field of Search .............. 426/233, 243, 246, 523; 340/233, 417, 227 R, 228 R; 219/412, 413, 450; 99/342, 344, 329 R

[56] References Cited

U.S. PATENT DOCUMENTS

| | | | |
|---|---|---|---|
| 3,003,048 | 10/1961 | Scott | 219/413 |
| 3,269,651 | 8/1966 | Willson | 219/413 |
| 3,364,338 | 1/1968 | Holtkamp | 219/413 |
| 3,560,711 | 2/1971 | Manecke | 219/413 |
| 3,611,336 | 10/1971 | Chen | 340/233 |
| 3,751,632 | 8/1973 | Kauranen | 219/413 |
| 3,859,644 | 1/1975 | Main | 426/233 X |

Primary Examiner—Raymond N. Jones
Assistant Examiner—R. A. Yoncoskie
Attorney, Agent, or Firm—Wooster, Davis & Cifelli

[57] ABSTRACT

An oven cooking monitor and method automatically control the cooking, to a selected degree of doneness, of a plurality of food times requiring different cooking times, thereby permitting the food items to be loaded into the oven in random size order and to be removed in the order in which they become done. In restaurant or fast food cooking a number of different roasts of beef of different sizes often are placed in an oven to be cooked to a uniform degree of doneness, or roasts of similar or different size are placed in an oven at different times. Uniform cooking, without overcooking, is achieved through the present invention by providing a separate disconnectable probe for each food item to generate a signal varying with the temperature sensed by each probe. A reference temperature signal is set to correspond to a desired degree of doneness, and the sensed temperature signal and reference temperature signal are compared, yielding an output signal when the sensed and reference temperatures match. When an output signal is generated to indicate that one of the food items has reached the desired degree of doneness, the monitor indicates the particular probe associated with the done food item and automatically switches the oven to a holding temperature substantially curtailing further cooking. The done food item is removed, and its probe is disconnected, whereupon the monitor stops the probe indicator and automatically switches the oven again to its cooking temperature. Cooking then proceeds until the next food item is done. In this fashion, a plurality of food items such as roasts can be cooked without requiring careful supervision, and without exceeding a prescribed degree of doneness, thereby reducing waste. Roasts may be loaded randomly, and removed in the indicated order in which they become done.

12 Claims, 2 Drawing Figures

OVEN COOKING MONITOR FOR UNIFORMLY COOKING A PLURALITY OF FOOD ITEMS REQUIRING DIFFERENT COOKING TIMES

BACKGROUND OF THE INVENTION

1. Field of the Invention

This invention relates to cooking monitors, and more particularly to a monitoring device and method for commercial ovens used, e.g., in restaurants, for cooking a plurality of food items requiring different cooking times. As an example, restaurant ovens frequently cook beef roasts, cooked to a precise degree of doneness, but which require different cooking times because the roasts have different sizes or because the roasts are put in the oven at different times to accommodate a flow of patrons.

2. Description of the Prior Art

Because restaurant cooks have other tasks to perform, it is desirable to provide a temperature monitoring system which will indicate when a food item, such as a roast, has attained a desired degree of doneness. Such monitors may accommodate several food items with separate temperature-sensing probes, and may be arranged to sound alarms to indicate that the internal temperature of a food item, as sensed by the probe, has reached a preset level corresponding to a desired degree of doneness. An example of such a monitor is shown in U.S. Pat. No. 3,611,336 to Chen.

At times, a cook may be preoccupied with other tasks and ignore the monitor's alarm. As a result, the food may become overcooked. If the alarm is recognized, but the roast is not yet needed for serving, the cook can reduce the oven temperature so that the roast will not overcook. Often, however, when the roast is later removed from the oven, the cook forgets to raise the oven temperature and an embarrassing delay may occur before the next roast is cooked enough for serving. As a result of these problems, present monitoring systems have not been altogether satisfactory.

SUMMARY OF THE INVENTION

It is a principal object of the present invention to provide an improved oven cooking monitor for controlling the cooking of a plurality of food items requiring different cooking times. Further objects of the invention are to provide such a cooking monitor which automatically prevents the food items from becoming overcooked, yet automatically permits each one to attain a desired degree of doneness despite requiring different cooking times, and to provide such a cooking monitor which is effective and simple. Still another object of the invention is to provide an oven cooking monitor suitable for commerical restaurant use, where food items may be loaded randomly, and removed one-at-a-time for serving.

In a preferred embodiment of the invention to be described hereinbelow in detail, the oven cooking monitor for a plurality of food items requiring different cooking times inserts a probe into each food item and generates a signal varying with the temperature sensed by the probe. A standard reference temperature signal is set, e.g., by means of a control dial, and a comparison is made between the sensed and referenced signals. When the signals match, an output is generated. Upon receipt of an output signifying that any one of the food items has attained a desired temperature, the monitor indicates, e.g., by means of a flashing indicator light, which probe is associated with the done food item. At the same time, the monitor automaticallyswitches the oven to a holding temperature substantially curtailing further cooking of the food items. At his leisure, or when demand arises, the cook removes the done food item, identified by the flashing light. The probe for his food item is disconnected, whereupon the monitor automatically stops the flashing indication and switches the oven again to its cooking temperature to proceed with the cooking of the remaining items. This arrangement advantageously allows a plurality of food items to be randomly loaded yet uniformly cooked, and guards against both overcooking and inadvertent delays in cooking. Accordingly, wastage, as well as two sources of stronger customer complaint, are sharply reduced, adding to restaurant profits and well being.

In further aspects of the invention, separate indicator lights provided for each probe are arranged to emit steady illumination when a probe is connected, and to flash when the probe senses the reference temperature. A temperature meter is arranged to visually indicate the temperature sensed by a selected probe. The monitor, moreover, is arranged with a single reference temperature signal source, and separate comparators for the probes, so that a succession of food items may be done uniformly.

Other objects, aspects and advantages of the invention will be pointed out in, or apparent from, the detailed description hereinbelow considered together with the following drawings.

DESCRIPTION OF THE PREFERRED EMBODIMENT

Figure 1:
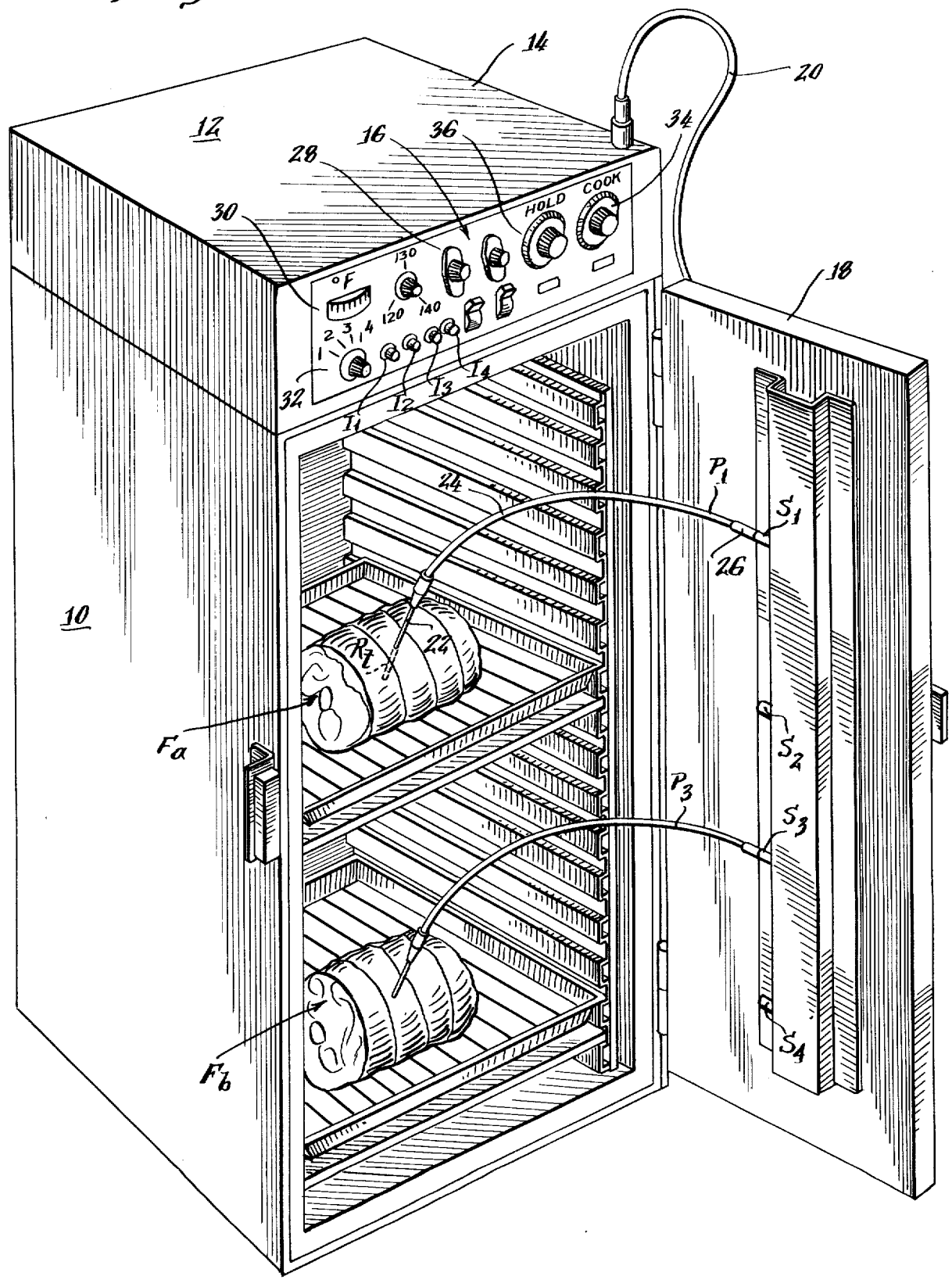
FIG. 1 is a perspective view of a commercial oven equipped with a cooking monitoring system according to the present invention.

FIG. 1 illustrates a commercial oven 10 equipped with an oven cooking monitor 12 which is constructed in accordance with the present invention. Such an oven, as indicated previously, frequently is called upon to cook a plurality of food items Fa and Fb, such as the illustrated beef roasts, requiring different cooking times because of different sizes or different times of placement in the oven.

In accordance with the present invention, the cooking of food items Fa and Fb is automatically controlled by monitor 12 to bring the food items to a selected uniform degree of doneness without overcooking and without risk of mistakes leading to delays in cooking. The monitor 12 permits food items to be placed into oven 10 in random order, without regard to size or timing, and to automatically monitor cooking so that the roasts are withdrawn in the order in which they attain the selected degree of doneness. Moreover, monitor 12 controls cooking in such a fashion that the cook can withdraw the done roasts whenever he desires, without being required to remove them the moment they become done. As a result, a plurality of food items can be commercially cooked with maximum convenience and minimum wastage and attention.

As illustrated in FIG. 1, the oven cooking monitor 12 has a control unit 14 mounted on top of oven 10 and positioning a control panel 16 at the front of the oven 10, just above the oven door 18. An electrical line 20 leads from the control unit 14 to the oven door 18, and terminates in a plurality, here four, of probe connecting sockets S1 through S4 mounted upon the interior surface of door 18. Each of the food items to be cooked, such as roasts Fa and Fb, has a temperature sensing probe, such as the illustrated probes P1 and P3, inserted at one end in the food item and connected at the other end to one of the sockets S1 through S4. The probes P1 and P3 are of known construction, having a rigid metal portion 22 for insertion into the food item, a flexible, Teflon covered portion 24 leading to a connector 26, a temperature sensing element such as a thermistor Rt at the end of the rigid metal portion 22, and internal electrical leads (not shown) connecting the temperature sensitive element Rt to connectors in the sockets S1, and thence through line 20 to control unit 14.

Probes P1 and P3 provide control unit 14 with separate measurement signals varying with the internal temperatures of roasts Fa and Fb. The control unit, as will be described below, is arranged to compare the sensed temperature signals with a reference temperature signal selected by means of a dial 28 which preferably is calibrated in degrees as shown to represent the desired degree of doneness the food items are to attain. The control panel 16 further displays four indicator lights I1 through I4, one for each probe. The indicator lights are arranged to emit steady illumination whenever a probe is plugged into the corresponding socket S1 through S4, and to emit flashing illumination whenever the corresponding probe has indicated its food item is done. To permit the cook to gauge the progress of cooking, the control panel 16 has a temperature meter 30, preferably calibrated in the same units as reference temperature dial 28. A selector dial 32 connects temperature meter 30 to a selected one of the four probes, so that the meter will indicate the internal temperature sensed by the selected probe.

Control panel 16 further comprises a selector dial 34 to set the cooking temperature of oven 10, and another selector dial 36 to set a lower holding temperature for oven 10, the holding temperature generally being one low enough to substantially curtail further cooking of the food items. In accordance with the present invention, control unit 14, when it senses that the internal temperature of one of the food items has reached the reference temperature selected by dial 28, proceeds not only to indicate with a flashing indicator light that the food item is done, but also automatically switches the oven operating temperature from its cooking temperature to its holding temperature. Accordingly, cooking stops and the food item that is done is maintained at the holding temperature, without overcooking, until the cook needs another roast for serving. When another roast is needed, the cook determines which roast is done by detecting which indicator light is flashing. The roast is removed from the oven, and the associated probe is disconnected from its socket. In accordance with the present invention, the control unit 14 then automatically turns out the indicator light for that probe, and automatically switches the oven 10 back to its cooking temperature. The remaining food items in oven 10 will then proceed to cook until the next food item reaches the reference temperature selected by dial 28. In this manner, roasts removed from the oven will be at a uniform degree of doneness notwithstanding differences in size, or the order in which they were put in the oven.

Figure 2:
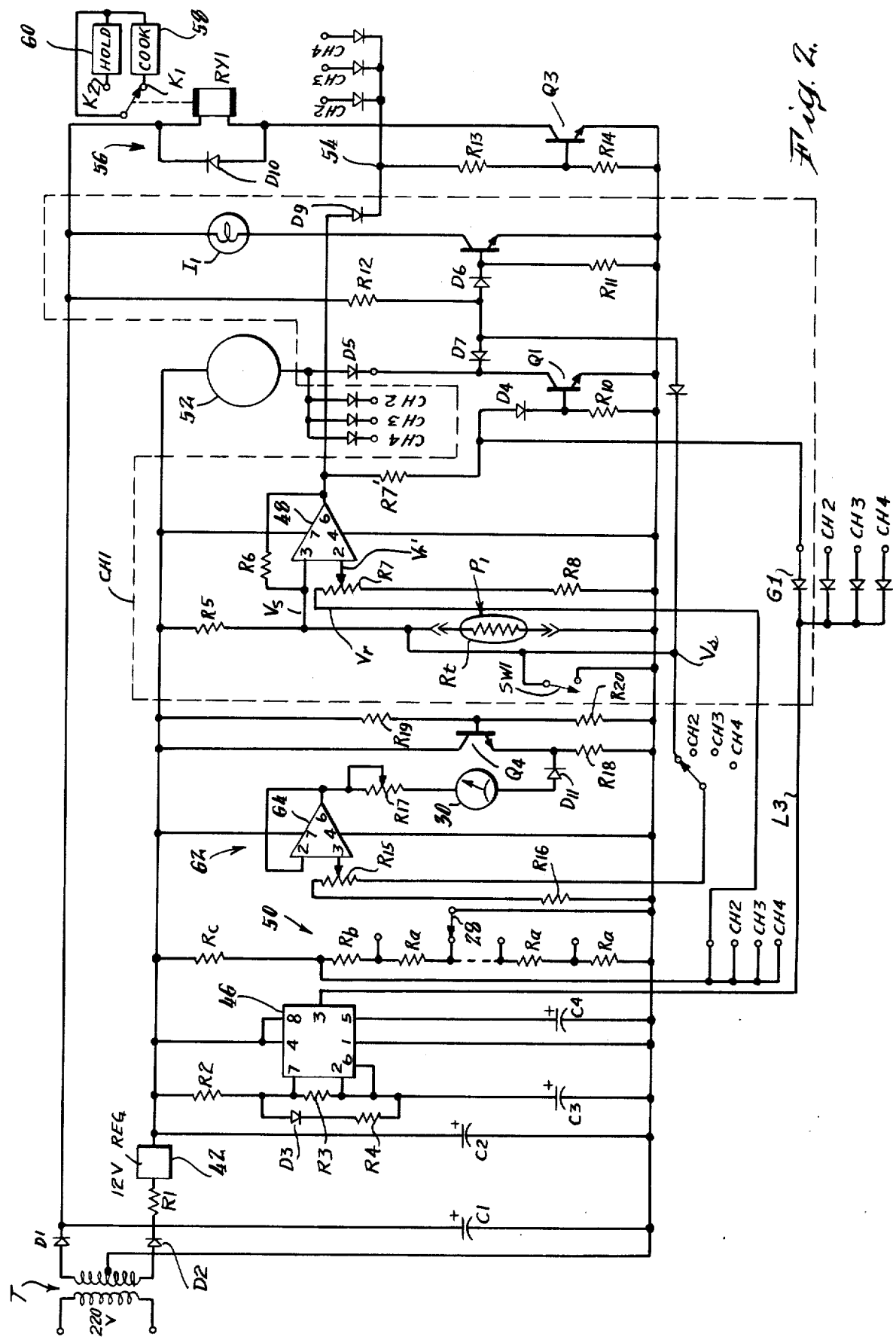
FIG. 2 is a schematic diagram illustrating a preferred form of monitoring circuit.

The operation of control unit 14 is governed by the circuit 40 illustrated in FIG. 2. As illustrated, a 220 volt a.c. input is reduced by a transformer T, rectified by diodes D1 and D2 and clamped by capacitor C1 to provide, on line L1, a source of 24 volt unregulated d.c. power. This signal is supplied through a resistor R1 to a 12 volt regulator 42 terminated by capacitor C2 to provide, on line L2, a source of regulated 12 volt d.c. power. An oscillator circuit 44 comprises a solid state oscillator component 46 connected between line L2 and ground with resistors R2, R3 and R4, diode D3, and capacitors C3 and C4, to provide on line L3 a low frequency wave signal varying between ground and +12 volts. The oscillating signal on line L3 is gated, in a manner to be described below, to an audible alarm 52 and to an indicator light to cause them to turn on and off intermittently.

Each of probes P1 through P4 is associated with a separate comparison circuit CH1 through CH4, of which only comparison circuit CH1 is illustrated in FIG. 2. The comparing and indicating circuit CH1 connects the variable resistance element Rt of probe P1 through a resistor R5 to line L2, to thereby form a voltage divider developing a sensed voltage signal Vs across element Rt which is applied to the positive input terminal of an operational amplifier 48 having a positive feedback resistor R6 and operating as a comparator. The connections of the amplifier are to the manufacturer's terminal numbers indicated thereon.

A reference temperature signal V4 is developed by a reference selector circuit 50.

The reference temperature selecting circuit 50, as shown in FIG. 2, is a voltage divider comprising 10 series resistors Ra of equal magnitude terminated with a resistor Rb, in series with a resistor Rc. Switch 28 selects among the intermediate taps between the resistors Ra and thus provides 10 different adjustment settings, e.g., at 2° intervals in the range of 120° F. to 140° F.

The reference temperature signal Vr is applied to the negative input terminal of the comparator 48 through a voltage divider comprising potentiometer R7 in series with resistor R8. Comparator 48 has an output when the voltage Vs at its positive input terminal exceeds the reference voltage Vr' applied to its negative input terminal. This condition arises whenever the sensed temperature of a food item matches the reference temperature selected by dial 28.

The comparator output is applied through a resistor R7 to open a gate diode G1 connected to oscillator line L3. The oscillating signal, gated by the comparator output, is applied through a diode D4 and resistor R10 to the input to a transistor switch Q1. The collector-emitter circuit of transistor Q1, which is alternately conducting and nonconducting, is connected through an isolating diode D5 to an alarm or bleeper 52 common to the four comparing and indicating circuits.

The output of transistor switch Q1 is also arranged to flash indicator light I1 by turning off a transistor switch Q2, connected in series with indicator light I1, whenever transistor Q1 conducts. The transistor switch Q2, as shown, is controlled by the input across a resistor R11, which is connected to line L1 through a resistor R112 and a diode D6. The collector of transistor Q1 is coupled to the base of transistor Q2 through the forward biased diode D6 and an oppositely biased diode D7. Accordingly, when transistor Q1 conducts, diode D7 will close, diode D6 will open, and transistor switch Q2 will open to disconnect indicator light I1. Similarly, when transistor Q1 is nonconducting, diode D7 will open, permitting a circuit to be completed through closed diode D6 to make trasnsitor Q2 conductive and to cause indicator light I1 to be energized and emit illumination. Since transistor switch Q1 is alternately made conductive and nonconductive by the oscillating signal on line L3, the indicator light I1 will flash with the same frequency.

The indicator light is also arranged to have a steady illumination to indicate that probe P1 is connected into its socket S1. As shown in FIG. 2, the sensed temperature signal Vs is applied through an isolating diode D8 to the anode of diode D6. Accordingly, whenever probe P1 is connected into its socket S1, the temperature sensing signal Vs will open diode D8, thus causing an input to be applied to transistor switch Q2 to cause it to conduct and thereby steadily energize indicator light I1. Socket S1 has a shunting contact SW1 which closes whenever a probe P1 is disconnected. When the contact closes, a grounding signal is applied through diode D8 to the anode of diode D6, causing the diode to open, switch Q2 to open, and indicator light I1 to extinguish. The grounding signal also is applied to the input of comparator 48, closing gate diode G1 and preventing the oscillating signal on line L3 from being applied to alarm 52 or light I1.

In accordance with the present invention, the outputs of the comparators in circuits CH1 through CH4 are applied through isolating diodes D9 to the common input 54 of an oven control circuit 56. An output from any comparator at common input point 54 is applied across resistors R13 and R14 and forms the input of a transistor switch Q3, which controls the application of power from line L1 through the winding of a relay RY1 shunted by free-wheeling diode D10. The relay RY1 has a normally closed contact K1 completing a circuit through a cooking temperature control circuit 58, and a normally open contact K2 completing a circuit through holding temperature control circuit 60. Accordingly, when none of the comparing circuits CH1 through CH4 has an output, the cooking temperature control circuit will be operative to develop a cooking temperature in oven 10. Whenever any comparator output is present, signifying that a food item is done, relay RY1 will automatically switch to contact K2 to cause holding temperature control circuit 60 to maintain the oven 10 at a holding temperature. Upon removal of the probe causing a comparator output to be present, the comparator output will drop and relay RY1 will again switch to contact K1 to cause cooking to resume.

Temperature meter 30 is driven through a circuit 62 comprising the selector switch 32, which receives the temperature sensing signal Vs from the desired probe, and a voltage divider circuit comprising potentiometer R15 and resistor R16 for applying a portion of the sensed voltage to the positive input terminal of an operational amplifier 64 having a shorted negative feedback line and therefore functioning as a buffer. The output of buffer 64 is applied through an adjustable scaling resistor R17 to one input of meter 30. The other input of meter 30 is connected through a diode D11 to a reference voltage developed across a resistor R18 in the emitter circuit of a transistor Q4, whose input is fixed by a voltage divider comprised of resistors R19 and R20. Meter movement over a scale of, e.g., 60° F. to 150° F., occurs when the output of the buffer amplifier exceeds the reference voltage.

The control circuit 40 described above supplies a uniform reference temperature signal Vr to each of the four comparison circuits CH1 through CH4. The food items Fa, Fb, etc. may be cooked to the same degree of doneness by leaving selector switch 28 at the same setting, or may be cooked to different degrees of doneness by changing the selector switch following the removal of a done roast. The circuit 40 is easily realized from standard components, and enables automatic, accurate cooking to take place. Use of the monitor is straightforward, because a glance at the control panel will indicate, through steady illumination from indicator lights I1 through I4, which probes are in use, and will indicate, by flashing of an indicator light, which probe is associated with a food item that is done and ready for removal. The automatic shifting between cooking and holding temperatures that occurs as roasts become done and are removed from the oven prevents overcooking, reduces wastage, and simplifies the cooking of a plurality of food items requiring different cooking items.

Examples of components used in a preferred version of control circuit 40 are set forth below:

| | |
|---|---|
| Operational amplifiers 48,64 | National Semiconductor 307 |
| Oscillator 46 | National Semiconductor 555 |
| R1 | 150 Ohms |
| R2 | 3K |
| R3 | 1M |
| R4 | 82K |
| R5 | 9.09K |
| R6 | 3.3M |
| R7 | 1M |
| R8 | 1.2M |
| R9, R10, R11 | 47K |
| R12 | 12K |
| R13, R14 | 4.7K |
| R15 | 1M |
| R16 | 10M |
| R17 | 1K |
| R18 | 1.5K |
| R19 | 8.2K |
| R20 | 3.9K |
| Ra | 44.2K |
| Rb | 5.9K |
| Rc | 8.12K |
| C1 | 500 microfarads |
| C2, C3 | 4.7 |
| C4 | .01 |
| D1, D2 | IN 2069 |
| D3-D11, G1-G4 | IN 4148 |
| Q1-Q4 | 2N2222 |

Although a specific embodiment of the invention has been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

We claim:

1. An oven cooking monitor for automatically controlling the cooking, to a selected degree of doneness, of a plurality of food items requiring different cooking times, to permit food items to be placed into an oven randomly and removed in the order in which each food item becomes done, comprising:
   a disconnectable probe for each food item, arranged to be inserted into the food item to sense its internal temperature;
   means connected to each probe for providing a signal varying with the internal temperature sensed by the probe;
   means for setting a reference temperature signal;
   means for comparing the temperature sensing signal from a probe with the reference signal and for providing an output signal when the sensed temperature matches the reference temperature;

means connected to the comparison means for receiving an output signal arising from the attainment by any of the probes of the reference temperature and, in response to such an output signal, (a) indicating which probe has sensed the done food item and (b) switching the oven to a holding temperature to curtail further cooking, and, in response to disconnecting of the probe for the done food item, said means (a) stopping indicating of that probe as the one associated with the done food item and (b) switching the oven again to a cooking temperature, whereby cooking of the food items proceeds until the next food item has reached the desired degree of doneness, thereby permitting the different food items to be cooked and stored safely until removal while preventing any overcooking thereof, and indicating the order in which the food items become done and are to be removed.

2. An oven cooking monitor for controlling the cooking of a plurality of food items as claimed in claim 1 wherein the means for indicating which probe has sensed the done food item comprises an indicator light for each probe and means responding to the comparison output signal for flashing the indicator light, said monitor further comprising means for steadily energizing the indicator light when its probe is connected and is sensing a temperature below the reference temperature.

3. An oven cooking monitor for automatically controlling the cooking of a plurality of food items as claimed in claim 1 further comprising a temperature meter for connection to a probe to visually indicate the internal temperature of the food item being sensed by the probe, whereby the internal temperature of each food item may be ascertained during cooking.

4. An oven cooking monitor for controlling the cooking of a plurality of food items as claimed in claim 1 wherein the means for comparing the sensed temperature signal with the reference temperature signal comprises a separate comparator for each probe, and wherein the means for setting a reference temperature signal applies a single reference signal to each comparator.

5. An oven cooking monitor for controlling the cooking of a plurality of food items as claimed in claim 1 further comprising means for setting the oven holding temperature, and means for setting the oven cooking temperature.

6. An oven cooking method for automatically controlling the cooking, to a selected degree of doneness, of a plurality of food items requiring different cooking times, to permit food items to be loaded into the oven in random order and removed in the order in which the food items become done, comprising: placing food items into an oven,
   inserting a temperature-sensing probe into each food item of a type that provides a signal varying with the temperature sensed by the probe, said temperature sensing probe being connected to said oven,
   setting a reference temperature signal to correspond to the desired degree of doneness,
   using self-actuating comparison means to compare the sensed temperature signal with the reference temperature signal and to provide an output signal when the sensed and reference signals match, to indicate which probe is associated with the done food items, and to switch the oven to a holding temperature curtailing further cooking of the food items,
   removing the done food from the oven and disconnecting the probe for the done food item from the oven, and
   in response to the disconnecting of the probe associated with the done food item, said comparison means stopping the indication that a food item is done, and switching the oven again to a cooking temperature to resume cooking of the remaining food items,
   whereby cooking of the food items proceeds with each food item attaining the desired degree of doneness with overcooking automatically prevented, and with an indication of the order in which the food items become done and are to be removed.

7. An oven cooking method for automatically controlling the cooking of a plurality of food items as claimed in claim 6 further comprising the steps of providing an indicator light in association with each probe, indicating the probe is associated with a done food item by flashing the indicator light, and indicating that a probe is connected and is below the reference temperature by steadily energizing the indicator light.

8. An oven cooking method for automatically controlling the cooking of a plurality of food items as claimed in claim 6 further comprising visually indicating on a meter the temperature sensed by a selected probe.

9. An oven cooking method for automatically controlling the cooking of a plurality of food items as claimed in claim 6 wherein the reference signal setting and comparing steps comprise setting a single reference temperature signal and comparing the signal reference signal with each of the sensed temperature signals provided by the probes.

10. An oven cooking method for automatically controlling the cooking of a plurality of food items as claimed in claim 6 further comprising setting the oven holding temperature, and setting the oven cooking temperature.

11. An oven cooking method for automatically controlling the cooking, to a selected degree of doneness, of a plurality of food items requiring different cooking times, to permit food items to be loaded into an oven randomly and removed in the order in which each food item becomes done, comprising:
   a probe for each food item arranged to be inserted into the food item to sense its internal temperature;
   means connected to each probe for providing a signal varying with the internal temperature sensed by the probe;
   means for setting a reference temperature signal;
   means for comparing the temperature sensing signal from each probe with the reference temperature signal and for providing an output signal when any sensed temperature matches the reference temperature; and
   means connected to the comparison means for receiving an output signal and, in response to such an output signal, indicating that the food item is done and switching the oven to a holding temperature to curtail further cooking, thereby permitting the food items to be cooked and safely stored until removal while preventing any overcooking thereof.

12. An oven cooking method as claimed in claim 11 wherein the probes are disconnectable, and wherein the means receiving the comparison output signal, in response to disconnecting of the probe in the done food item, stops indicating that a food item is done and switches the oven again to a cooking temperature.

* * * * *